United States Patent [19]

Muro et al.

[11] 4,136,073

[45] Jan. 23, 1979

[54] PROCESS FOR TREATING AN ALUMINUM SURFACE

[75] Inventors: Kakuro Muro, Komae; Kuniji Yashiro, Yokohama; Hideaki Kaneko; Kiyoichi Yamazaki, both of Tokyo, all of Japan

[73] Assignee: Oxy Metal Industries Corporation, Warren, Mich.

[21] Appl. No.: 642,960

[22] Filed: Dec. 22, 1975

[30] Foreign Application Priority Data

Dec. 25, 1974 [JP] Japan ............................. 49/147949

[51] Int. Cl.$^2$ .......................... B44D 1/06; C08L 7/00; C08L 9/00; C08L 31/00
[52] U.S. Cl. .......................... 260/29.2 EP; 106/14.21; 252/387; 260/29.2 TN; 260/29.2 M; 260/29.2 E; 260/29.2 UA; 260/29.6 XA; 260/29.7 M; 427/435
[58] Field of Search .................... 106/14; 252/387; 260/29.2 TN, 29.2 EP, 29.2 M, 29.2 E, 29.2 MM, 29.2 UA, 29.2 T, 29.2 H, 29.6 XA, 29.7 M; 427/435

[56] References Cited

U.S. PATENT DOCUMENTS

| | | | |
|---|---|---|---|
| 3,447,972 | 6/1969 | Wilde et al. | 106/14 X |
| 3,687,882 | 8/1972 | Bishop | 260/29.2 M |
| 3,796,582 | 3/1974 | Leahey et al. | 106/14 X |
| 3,865,617 | 2/1975 | Shimizu et al. | 427/435 X |
| 3,960,610 | 6/1976 | Steinbrecher et al. | 427/435 |

OTHER PUBLICATIONS

Chem. Abs. 81: P157776c.

*Primary Examiner*—Thomas De Benedictis, Sr.
*Attorney, Agent, or Firm*—Arthur E. Kluegel; Richard P. Mueller

[57] ABSTRACT

Disclosed is a composition and process useful for improving the corrosion resistance and/or paint adhesion of an aluminum surface. The composition is an aqueous acidic one containing an organic film-forming polymer and a titanium compound in a weight ratio of polymer : Ti of 100 : 1 to 1 : 10. The aluminum surface is contacted with the composition at a temperature not in excess of 70° C.

7 Claims, No Drawings

PROCESS FOR TREATING AN ALUMINUM SURFACE

BACKGROUND OF THE INVENTION

This invention relates to a process for the surface treatment of aluminum and alloys thereof to improve the corrosion resistance and adhesion of paints to the surface.

In conventional surface treatments of aluminum and its alloys, there have been generally employed metallic compounds of, for example, chromium, iron, manganese, aluminum, zinc, nickel, calcium and the like as water-soluble inorganic compounds together with phosphoric acid, nitric acid, sulfuric acid, hydrofluoric acid, chromic acid, boric acid and the like to deposit water-insoluble salts on the metal surface to improve the corrosion resistance and adhesion of paints applied thereto. These have been generally employed as aqueous chemical conversion coating solutions. Chemical conversion coatings containing predominantly metallic compounds other than the above-listed ones may provide insufficient corrosion resistance and adhesion of paints applied thereon. Moreover, the use of treating liquid compositions containing heavy metal ions, such as chromium, is restricted because of environmental discharge limitations.

SUMMARY OF THE INVENTION

It has not been discovered that an organic polymer coating containing titanium can be deposited by chemical conversion using a treating bath containing an organic film-forming polymer as the predominant components and a water-soluble titanium compound. The purpose of this invention can be achieved by a surface treatment of aluminum or an alloy thereof in which the metal surface is treated with an aqueous acidic treating bath containing an organic film-forming polymer and a water-soluble titanium compound at a temperature range from ambient temperature to 70° C by any conventional application method to deposit the organic film-forming coating containing titanium. Aluminum and alloys thereof usable in the treatment according to this invention include, for example, composites such as aluminum-coated steel plates, aluminum die cast and aluminum casts, etc. and aluminum moldings.

DETAILED DESCRIPTION OF THE INVENTION

This invention comprises a composition and process whereby an aluminum or aluminum alloy surface is contacted with an aqueous acidic bath containing a stable organic film-forming polymer and a soluble titanium compound.

Any water-soluble titanium compound is usable in this invention. Examples include $K_2TiF_6$, $Na_2TiF_6$, $(NH_4)_2TiF_6$, $TiF_4$, $Ti(SO_4)_2$, $TiOSO_4$ and the like. Titanium compounds which are soluble in an acidic solution such as $TiO$, $Ti_2O_3$, $TiO_2$, $H_2TiO_3$, $H_4TiO_4$ and the like are also usable. The titanium compound is present in an amount sufficient to improve the corrosion resistance or paint adhesion characteristics. A concentration of 0.01 to 5% is preferred. The pH value of the bath is preferably adjusted to a value of 1.2 to 5.5.

In order to improve the solubility of these compounds or to adjust the pH of solution within the range from 1.2 to 5.5, it is possible to use an inorganic acid such as phosphoric acid, nitric acid, sulfuric acid, hydrofluoric acid and the like or salts thereof or an organic acid such as oxalic acid, citric acid, malic acid, maleic acid, phthalic acid, acetic acid or the like or salts thereof. Common inorganic bases may also be employed where necessary.

In order to promote the film-forming reactions, there may be used an oxidizing agent such as $NaNO_3$, $HNO_3$, $NaClO_3$, $HNO_2$, $H_2O_2$, hydroxylamine and the like which have been conventionally used in the phosphating, chromate conversion coating and similar processes.

A stable, organic film-forming polymer is one which is stable at the bath pH for at least 24 hours. The organic film-forming polymer may be any water-soluble or emulsified resin conventionally employed including aqueous solutions and emulsions such as vinyl polymers and copolymers derived from monomers such as vinyl acetate, vinylidene chloride, vinyl chloride; acrylic polymers and copolymers derived from monomers such as acrylic acid, methacrylic acid, acrylic esters, methacrylic esters and the like; aminoalkyd, epoxy, urethane-polyester, styrene and olefin-polymers and copolymers; and natural and synthetic rubbers. The quantity of polymer will be an amount sufficient to improve the corrosion resistance or paint adhesion, preferably 0.1 to 60 wt.%.

In order to prepare the treating bath containing the organic film-forming polymer and the water-soluble titanium compound, the organic film-forming polymer may be dissolved or emulsified in water after which the water-soluble titanium compound in solution or solid state is added, or the water-soluble titanium compound may be added concurrently in the preparation of the polymer solution or emulsion.

The presence of fluoride in the bath is advantageous because fluoride promotes the chemical reaction with the aluminum surface and also because it aids in solubilizing the titanium present.

The ratio of the organic film-forming polymer to the water-soluble titanium compound (expressed as Ti) may range from 100 : 1 to 1 : 10 by weight, preferably from 20 : 1 to 1 : 1 by weight.

It is essential to maintain the pH of treating bath at a suitable value in order to deposit the organic film-forming polymer and titanium. For most polymers, the best pH ranges from 1.2 to 5.5, more preferably from 1.5 to 4.0. If the pH is less than 1.2, undue pickling will occur, resulting in poor deposition. On the other hand, at higher pH values, insufficient chemical attack of the surface will occur resulting also in poor deposition.

The temperature of treating bath ranges from room temperature to 70° C. At a temperature of lower than room temperature, it will take much time to form the coating of sufficient thickness. At a temperature of higher than 70° C, some problem will likely be encountered in the stability of bath.

The coating obtained according to this invention provides excellent bare corrosion resistance and improved paint adhesion.

This invention will be further illustrated by way of the following examples.

EXAMPLE 1

A treating bath was prepared as follows: 5g of titanium ammonium fluoride $(NH_4)_2TiF_6$ was dissolved in 100ml of pure water, to which was added 25g of an aqueous 40% solution (by weight) of commercially available acrylic ester emulsion (Toacryl N-142 prepared by Toyo Co.) and made up to 1 liter by diluting with pure water. The resulting solution was adjusted to a pH of about 2.8 by addition of 1.2g of phosphoric acid.

The treating bath thus prepared was maintained at 30° C and a clean aluminum panel (2S) having a size of 0.6 × 70 × 150 mm and which had been cleaned by rinsing with a conventional alkaline degreasing agent was immersed therein for 3 minutes, followed by rinsing with water and drying.

When the surface-treated aluminum panel was subjected to the salt spray test according to JIS-Z-2371, no development of white rust was observed even after the test for 120 hours. The development of white rust after the test for 240 hours was less than 5% as shown in Table 1. The aluminum panel was surface treated in the same manner as mentioned above, followed by rinsing with water and dried. The surface treated plate was then coated with an acrylic paint (KP 2406 Enamel Light Blue prepared by Kansai Paints Co.) in a thickness from 18 to 20 microns and then baked at 290° C for 45 seconds to provide a pencil hardness from H to 2H. Table 1 shows results of paint adhesion testing after immersion for 2 hours in boiling pure water and after the moisture-proof test for 1,000 hours. As controls, aluminum panels of the same grade were prepared and treated with one bath free from the acrylic emulsion (Control I) and another bath free from titanium ammonium fluoride (Control II) under the same conditions, followed by coating with the same paint and the same adhesion tests. Table 1 also shows results of test specimens cleaned only (free from any treatments) (Control III).

Method of test for adhesiveness of coating:

(1) Bend test

The painted test panel was bent 180° around one (1T) or three (3T) panels the same panel thickness as the specimen. The painted surface was then subjected to the friction pull test at the bend with Scotch tape to measure the adhesion of paint thereto. Because of the smaller radius of curvature, the 1T bend is a much more severe test than the 3T bend.

TABLE 1

| Specimen | Corrosion resistance 240 Hr. Salt Spray % White Rust | Paint Adhesion | | | | Moisture Proof test for 1,000 hrs | |
|---|---|---|---|---|---|---|---|
| | | As Painted | | Immersion for 2 hrs in boiling water | | | |
| | | 1T | 3T | 1T | 3T | 1T | 3T |
| Example 1 | Less than 5% | 9.5 | 10 | 9.5 | 10 | 7.5 | 9.5 |
| Control I | 100% | 0 | 7.5 | 0 | 7.5 | 0 | 0 |
| Control II | 100% | 0 | 7.5 | 0 | 0 | 0 | 0 |
| Control III | 100% | 0 | 0 | 0 | 0 | 0 | 0 |

The results were evaluated as follows:
10 : No Change
9.5 : Peeling of less than 5%
7.5 : Peeling of less than 25%
0 : Peeling of more than 25%

EXAMPLE 2

A treating bath was prepared as follows: 1g of Titanium ammonium fluoride $(NH_4)_2TiF_6$ was dissolved in 500 ml of pure water. 50g of an aqueous 40% by weight solution of commercially available acrylic ester emulsion (Primal E-269 prepared by Nippon Acryl Co.) was then added and made up to 1 liter by diluting with pure water. 5ml of 55% hydrogen peroxide were then added and the bath adjusted to a pH value of 2.8.

A clean aluminum panel (2S) having size of 0.6 × 70 × 150 mm which had been cleaned by rinsing with conventional alkaline degreasing bath was immersed into the treating bath maintained at 30° C for 5 minutes, followed by rinsing and drying.

Table 2 shows results obtained by the tests according to Example 1.

Table 2

| Corrosion Resistance 240 Hr. Salt Spray % White Rust | Paint Adhesion | | | | Moisture proof test for 1,000 hrs | |
|---|---|---|---|---|---|---|
| | As Painted | | Immersion for 2 hrs in boiling water | | | |
| | 1T | 3T | 1T | 3T | 1T | 3T |
| Less than 5% | 9.5 | 10 | 9.5 | 9.5 | 7.5 | 9.5 |

What is claimed is:

1. A process for treating an aluminum surface without the use of chromium chemicals comprising contacting the surface with an aqueous chromium-free acidic composition consisting essentially of a stable organic film-forming polymer and a soluble titanium compound in a weight ratio of polymer : Ti of 100 : 1 to 1 : 10.

2. The process of claim 1 wherein the composition is maintained at a temperature not in excess of 70° C.

3. The process of claim 2 wherein the ratio of polymer : Ti is 20 : 1 to 1 : 1.

4. The process of claim 2 wherein the polymer concentration is 0.1 to 60 wt. % and the Ti concentration is 0.01 to 5 wt. %.

5. The process of claim 2 wherein the composition additionally contains fluoride.

6. The process of claim 2 wherein the composition exhibits a pH value of from 1.2 to 5.5.

7. The process of claim 2 wherein the film-forming polymer is selected from the group of polymers and copolymers consisting of vinyl, acrylic, aminoalkyd, epoxy, urethane polyester, styrene, and olefin polymers and copolymers and natural and synthetic rubbers.

* * * * *